United States Patent [19]
Thompson et al.

[11] Patent Number: 5,846,418
[45] Date of Patent: Dec. 8, 1998

[54] POINT-OF-USE WATER TREATMENT SYSTEM

[75] Inventors: Paul Martin Thompson; Daniel L. Glidden, both of Fort Collins, Colo.

[73] Assignee: Teledyne Industries, Inc., Fort Collins, Colo.

[21] Appl. No.: 896,683

[22] Filed: Jul. 18, 1997

Related U.S. Application Data

[63] Continuation of Ser. No. 568,014, Dec. 6, 1995, abandoned.
[51] Int. Cl.$^6$ .......................... B01D 24/34; B01D 29/01; C02F 1/50
[52] U.S. Cl. .......................... 210/266; 210/282; 210/468; 210/469; 210/474; 210/475; 210/477; 210/482; 210/501
[58] Field of Search .................................. 210/266, 282, 210/501, 469, 475, 468, 466, 764, 206, 288, 504, 474, 477, 482

[56] References Cited

U.S. PATENT DOCUMENTS

| | | | |
|---|---|---|---|
| 2,711,994 | 6/1955 | Quinn | 210/16 |
| 2,781,312 | 2/1957 | Klumb et al. | 210/282 |
| 2,792,942 | 5/1957 | Feuillet | 210/501 |

(List continued on next page.)

FOREIGN PATENT DOCUMENTS

WO 95/18265   7/1995   WIPO .

OTHER PUBLICATIONS

Shuttle™ I-32 Iodine–Based Water Disinfection System; Pure 1 Systems, Billerica, MA (Nov. 15, 1995).
SemperPRO™ Reverse Osmosis Systems; SemperPure Systems, Inc., New Rochelle, NY (1995).
SemperCHLOR™ Drinking Water Chlorinator System; SemperPure Systems, Inc., New Rochelle, NY (1995).
The SemperPURE™ Iodine–Based Water Disinfection System; SemperPure Systems, Inc., New Rochelle, NY (1995).
The SemperFresh™ Water Filtration System; SemperPure Systems, Inc., New Rochelle, NY (1995).
SemperPure™ is the solution, for clean, safe economical water . . . when others run dry; SemperPure Systems, Inc., New Rochelle, NY (1994).
Pure1 is the solution, for clean, safe, economical water . . . when others run dry; SemperPure Systems, Inc., New Rochelle, NY (1995).
EasyFull 1–31™ Iodine Disinfection System; SemperPure Systems, Inc., New Rochelle, NY (1995).
EasyFull 29™ Water Filtration System; SemperPure Systems, Inc., New Rochelle, NY (1995).
EasyFull C–30™ Chlorine Disinfection System; Semper-Pure Systems, Inc., New Rochelle, NY (1995).
An Exciting New Concept In bottle Water! Less Filling! Tastes Great!; (Advertisement bearing U.S. Patent 4923091).

(List continued on next page.)

*Primary Examiner*—Cynthia L. Nessler

[57] ABSTRACT

The point-of-use water treatment system for treating water to be dispensed from a container includes a filter media positioned adjacent a water input opening of the container, through which water is filtered into the container. The filter media includes a water soluble disinfectant positioned thereon or therein, with the preferred disinfectant tetraglycine hydroperiodide, chloramine-T, or calcium hypochlorite. The disinfectant dissolves in the water as it passes through the filter, and reduces the biological activity of microbiological agents in the water. A point-of-use method of the present invention which reduces microbiological contamination in a predetermined volume of water to be dispensed from a container which utilizes a filter media containing a water soluble disinfectant impregnated thereon is also disclosed. The method includes the steps of positioning the filter media adjacent the opening of the container, filtering water through the filter media, dissolving the disinfectant in the water as it passes through the filter media, allowing the disinfectant to contact and deactivate microbiological agents in the water, and disposing of the filter media.

8 Claims, 1 Drawing Sheet

U.S. PATENT DOCUMENTS

| | | | |
|---|---|---|---|
| 3,327,859 | 6/1967 | Pall | 210/501 |
| 3,408,295 | 10/1968 | Vaichulis | 210/62 |
| 3,462,363 | 8/1969 | Mills | 210/764 |
| 3,693,632 | 9/1972 | Tolman | 131/266 |
| 3,772,189 | 11/1973 | Kreusch et al. | 210/764 |
| 3,872,013 | 3/1975 | Nishino et al. | 210/501 |
| 3,923,665 | 12/1975 | Lambert et al. | 210/501 |
| 4,024,991 | 5/1977 | Tyson et al. | 210/501 |
| 4,145,291 | 3/1979 | Console et al. | 210/501 |
| 4,151,092 | 4/1979 | Grimm et al. | 210/256 |
| 4,198,296 | 4/1980 | Doumas et al. | 210/501 |
| 4,238,477 | 12/1980 | Lambert et al. | 424/79 |
| 4,275,194 | 6/1981 | Kato et al. | 536/20 |
| 4,367,149 | 1/1983 | Kinman | 210/763 |
| 4,389,311 | 6/1983 | La Freniere | 210/282 |
| 4,505,823 | 3/1985 | Klein | 210/668 |
| 4,529,511 | 7/1985 | Breeden et al. | 210/94 |
| 4,555,347 | 11/1985 | O'Dowd et al. | 210/752 |
| 4,594,361 | 6/1986 | Beauman et al. | 521/28 |
| 4,661,344 | 4/1987 | Relenyi | 424/79 |
| 4,748,904 | 6/1988 | Razeto et al. | 99/467 |
| 4,749,481 | 6/1988 | Wheatley | 210/283 |
| 4,764,274 | 8/1988 | Miller | 210/266 |
| 4,769,143 | 9/1988 | Deutsch et al. | 210/266 |
| 4,828,692 | 5/1989 | Peranio | 210/266 |
| 4,888,118 | 12/1989 | Barnes et al. | 210/668 |
| 4,923,091 | 5/1990 | Sutera | 222/67 |
| 4,948,499 | 8/1990 | Peranio | 210/266 |
| 4,999,109 | 3/1991 | Sabre | 210/501 |
| 5,011,602 | 4/1991 | Totani et al. | 210/501 |
| 5,114,042 | 5/1992 | Sutera | 222/67 |
| 5,176,836 | 1/1993 | Sauer et al. | 210/670 |
| 5,186,830 | 2/1993 | Rait | 210/232 |
| 5,225,078 | 7/1993 | Palasky et al. | 210/282 |
| 5,308,482 | 5/1994 | Mead | 210/207 |
| 5,366,636 | 11/1994 | Marchin et al. | 210/665 |
| 5,367,031 | 11/1994 | Marchin et al. | 525/328.3 |
| 5,370,041 | 12/1994 | Lowe | 210/282 |
| 5,401,399 | 3/1995 | Magnusson et al. | 210/266 |
| 5,405,526 | 4/1995 | Sutera | 210/469 |
| 5,407,573 | 4/1995 | Hughes | 210/266 |
| 5,464,603 | 11/1995 | Marchin et al. | 423/501 |

OTHER PUBLICATIONS

Although Loch Ness is still a Mystery . . . POU chlorination no longer is.; SemperPure Systems, Inc., New Rochelle, NY (1995).

Pure 1 (four page brochure—no author) (at least as early as Dec. 6, 1995).

When you thirst for POU success you need connections, not expensive point–of–use coolers.; SemperPure Systems, Inc., New Rochelle, NY (1995).

Systems Guide Pure1 Systems, SemperPure Systems, Inc., New Rochelle, NY (1995).

Now you can have disinfected drinking water, no matter where you are!; SemperPure Systems, Inc., New Rochelle, NY (1995).

"The Teledyne Water Pik Pour–Thru Water Filter Pitcher System . . . featuring WATERFRESH filter technology," Teledyne Water Pik, Fort Collins, Colorado (at least as early as Dec. 6, 1995).

POINT-OF-USE WATER TREATMENT SYSTEM

This application is a continuation of U.S. application Ser. No. 08/568,014, filed Dec. 6, 1995, now abandoned.

BACKGROUND OF THE INVENTION

1. Field of the Invention

This invention relates to water treatment systems suitable for point-of-use treatment of water. More particularly, this invention relates to point-of-use water treatment systems intended to reduce microbiological activity in water intended for individual consumption.

2. Description of the Prior Art

It is well known that many deadly diseases are transmitted to humans by microbial agents in water, and that disease transmission is significantly reduced by microbial treatment of the water prior to human consumption. It is the bacteria, virus and protozoan cysts in water which necessitate microbiological treatment. Microbiological treatment is performed on a large scale at water treatment plants worldwide, primarily through chemical disinfection with chlorine and iodine. However, the hazards associated with the handling such chemicals, difficulties associated with accurately measuring the proper amount of such chemicals, and the taste and odor problems generally associated with individual application of such chemicals, make large-scale microbiological water treatment techniques unsatisfactory for individual point-of-use water treatment needs.

For example, chlorine gas injection systems, while commonly used in water treatment plants, are impractical for individual use due to the corrosive, toxic, and explosive nature of chlorine gas. Silver-based compounds are also problematical. Although such compounds have some disinfectant capability, toxicity problems are associated with their manufacture, use and disposal.

Iodinated resins are now commonly used in point-of-use water filtration devices. Although costly, such devices do maintain residual iodine levels and thus are suitable for treating 50–1000 liters of water. Unfortunately, it is difficult to maintain a constant alution of iodine through product life, with iodine release highly dependent on water pH and temperature. This uncertain iodine release creates uncertainty in the quality of the treated water.

It is also well known that boiling water at the point-of-use can successfully reduce microbiological activity in water. However, the process is time-consuming and requires equipment and fuel source which are not always readily available.

Currently available point-of-use systems include mechanical entrapment, ultraviolet radiation (UV), and ozonation methodologies. Although mechanical entrapment is generally effective for sediment collection, it must be performed at a very high efficiency at submicron sizes to reduce microbiological activity. Naturally, sediment loading is a problem when trapping submicron particles. Sediment loading has a tendency to promote bacterial growth and media colonization, rather than reduce such activity. UV devices are available to purify water and reduce microbiological activity therein. However, such devices are sometimes costly, often bulky and typically require a power source to operate. Moreover, UV devices are generally ineffective for inactivating cysts and are also ineffective in high turbidity water. Ozonation devices can also be costly, and typically require a power source. In addition, residual ozone imparts an unpleasant taste to treated water, and excess human exposure to released ozone gas is undesirable.

Thus, microbiological treatment of water remains especially problematical for individuals when camping, backpacking and traveling, and during military maneuvers, floods, and other natural disasters.

While the Environmental Protection Agency has promulgated a Guide Standard and Protocol for Testing Microbiological Water Purifiers, the Guide does not purport to evaluate particular point-of-use water treatment systems. The Guide identifies water quality indicators of temperature, turbidity, pH, total organic carbon and total dissolved solids, which may vary in the water to be treated, and have separate standards which may need to be maintained during microbiological reduction treatment. The Guide specifically describes the method and acceptance criteria for various disinfection methods.

One point-of-use water treatment systems which is currently available and which is designed to reduce lead, chlorine, pesticides, sediment, odor and unpleasant taste is the Pour-Through Water Filter Pitcher System available through Teledyne Water Pik® of Fort Collins, Colo., the assignee of the present invention. The system utilizes a pitcher and lid arrangement, and a special disposable/replaceable filter which is positioned in a basket portion of the pitcher lid. The filter traps undesirable particulates and organic molecules from water filtered therethrough. The system does not purport to disinfect the water during the filtration process.

It is against this background that the significant improvements and advancement of the present invention have taken place in the field of point-of-use water treatment systems.

SUMMARY OF THE INVENTION

In accordance with its major aspects, a point-of-use water treatment system for treating water to be dispensed from a container includes a one-time disposable, filter media positioned adjacent a water input opening of the container, through which water is filtered into the container. The filter media includes a water soluble disinfectant impregnated in or on the filter media which dissolves in the water as the water filters therethrough, and passes dissolved in the water into the container. The dissolved disinfectant reduces the biological activity of microbiological agents in the water.

The preferred embodiment of the point-of-use water treatment system of the present invention is adapted for use with a container designed to hold a predetermined volume of water. More particularly, the water soluble disinfectant is impregnated on or in the filter media in an amount predetermined to reduce microbiological contamination in the predetermined volume of water by a predetermined amount.

In preferred embodiments of the point-of-use water treatment system of the present invention, the filter media includes a sheet of hardened ashless paper upon which tetraglycine hydroperiodide, chloramine-T, or calcium hypochlorite has been impregnated. The filter media is preferably positioned in a funnel-shaped housing through which all water introduced into the container must pass.

An alternative embodiment of the present invention also includes an outlet filtration media positioned adjacent a dispensing port of the container. The outlet filtration media is adapted to filter residual disinfectant and halogen salts from the treated water.

A point-of-use method of the present invention which reduces microbiological contamination in a predetermined volume of water to be dispensed from a container utilizes a filter media containing a water soluble disinfectant impregnated thereon. The method includes the steps of positioning the filter media adjacent the opening of the container, filtering water through the filter media, dissolving the disinfectant in the water as it passes through the filter media, allowing the disinfectant to contact and deactivate microbiological agents in the water. After dispensing the treated water from the container, the filter media is preferably discarded.

The present invention provides for a low cost, portable, point-of-use system in which microbiological contamination in water is reduced without need for mechanical devices, fuel or power requirements. Chemical disinfectants are premeasured. Contact of the user with disinfectant or other chemicals is avoided, and risk of injury arising from improper handling or measuring of chemicals is thereby reduced. The preferred filter media is biodegradable.

A more complete appreciation of the present invention and its scope can be obtained from understanding the accompanying drawings, which are briefly summarized below, the following detailed description of the presently preferred embodiments of the invention, and the appended claims.

DETAILED DESCRIPTION OF THE INVENTION

Figure 1:
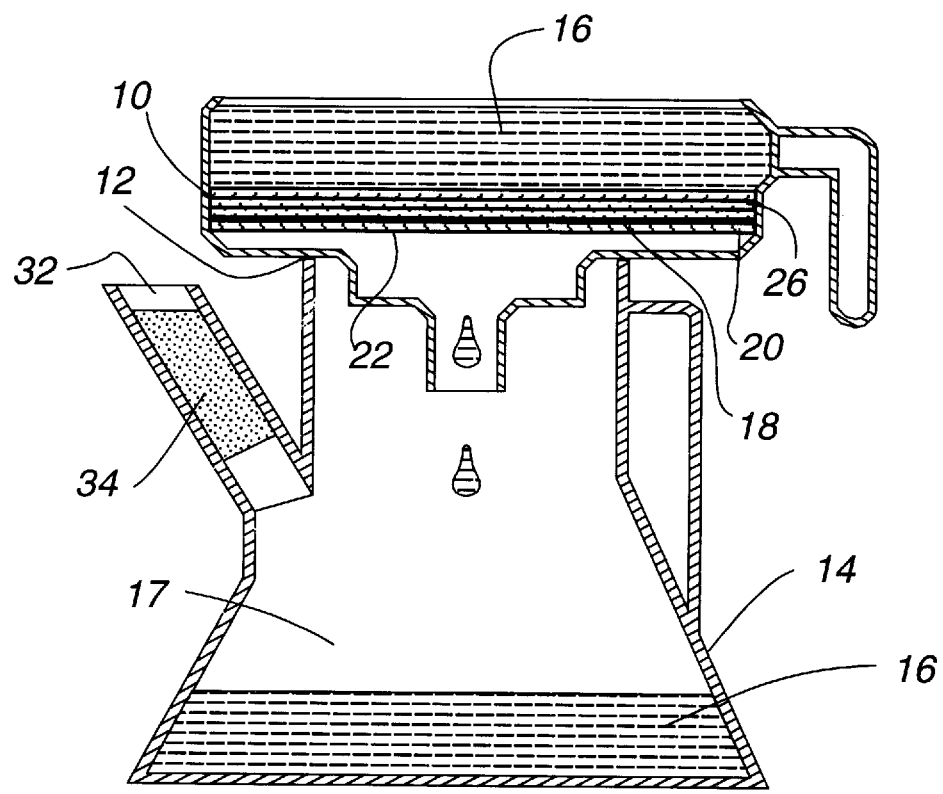
FIG. 1 is a section view of a container of water in which an embodiment of the point-of-use water treatment system of the present invention is positioned.
Figure 2:
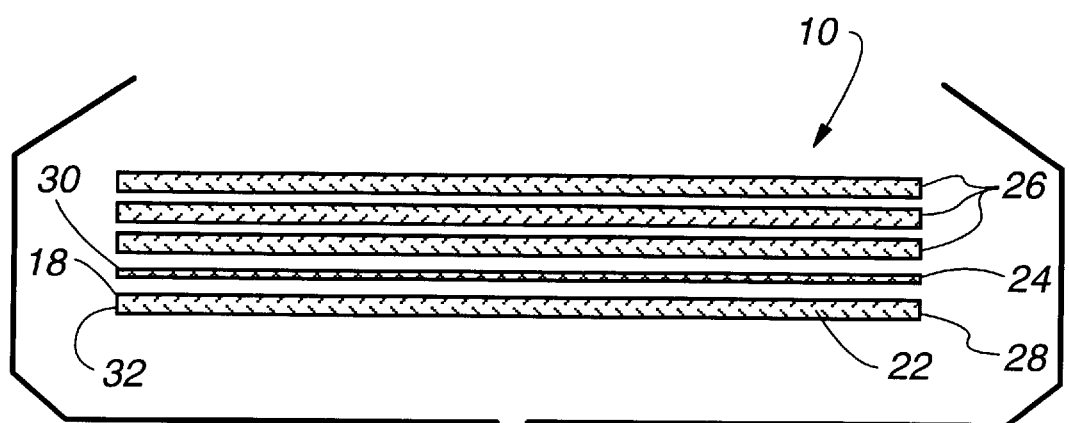
FIG. 2 is a enlarged section view of the water treatment system of the present invention shown in FIG. 1.

A preferred embodiment of the point-of-use water treatment system 10 of the present invention, suitable for disinfecting water for individual consumption, is shown in FIGS. 1 and 2. In the context of the present application, the terms "disinfect", "disinfecting" and "disinfection" are intended to cover compositions and their use which result in the reduction of microbiological activity in water to a level generally considered safe for human consumption. The water treatment system 10 is positioned adjacent to an opening 12 of a container 14 adapted to hold two liters of water 16 in a dwelling chamber 17 of the container 14. The water treatment system 10 is preferably mounted in a filter pack 18 positioned in a funnel-shaped housing 20. The filter pack 18 contains a filter media 22 on which a water soluble disinfectant 24 is impregnated. The filter pack 18 also includes a prefiltration media 26 impregnated with activated carbon and minerals, for trapping sediments, particulates, and organic molecules.

In the preferred embodiment, the filter media 22 is a 150 mm diameter round, hardened ashless filter paper disk 28, such as that available from Whatman International Ltd. of Springfield Mill, Maidstone, Kent, Great Britain, and designated filter paper no. 541. Two hundred milligrams of the preferred water soluble disinfectant 24, a powdered mixture containing by weight 83.3% inert ingredients and 16.7% tetraglycine hydroperiodide ($C_{16}H_{48}I_7N_8O_{16}$), is pressed into the filter paper disk 28, forming a disinfectant layer 30. The prefiltration media 26 is then positioned over the disinfectant layer 30. The filter pack 18 is then compressed with a compression die, which embosses the outer edge 32 of the filter 18, thereby forming the filter pack 18 into a single circular disk.

To use the point-of-use water treatment system 10 of the present invention, the filter pack 18 containing the filter media 22 and the water soluble disinfectant 24 is placed in the housing 20, which preferably has an inside housing diameter (not shown) substantially the same as the diameter of the filter pack 18, so as to snugly receive the filter pack 18 therein. Two liters of water 16 are then poured onto the filter pack 18, allowed to filter therethrough at an average rate of two to five minutes per liter, and collect in the dwelling chamber 17 of the container 14. The water 16 and the disinfectant dissolved therein are maintained in the dwelling chamber 17 for zero to ten minutes after filtration of the two liters of water 16 is complete, with effective reduction of *Klebsiella terrigena* bacteria achieved when the water 16 and the dissolved disinfectant have been tested immediately after collecting in the dwelling chamber 17, as is summarized below in Table I.

TABLE I

| Disinfectant Amount | Dwell Time (min) | Counts cfu/g | Percent Reduction | Log Reduction |
| --- | --- | --- | --- | --- |
| 200 mg | 0 | Initial 2.10E+08 | | |
| | | Final 1.60E+01 | 99.9999924 | 7.12 |
| | 5 | Initial 2.10E+08 | | |
| | | Final 5.00E−01 | 99.9999998 | 8.62 |
| | 10 | Initial 2.10E+08 | | |
| | | Final 6.00E+00 | 99.9999971 | 7.54 |

When disinfecting two liters of water with a filter pack 16 containing 200 mg of tetraglycine hydroperiodide, as described above, average residual disinfectant levels of iodine range from two to eight mg of iodine per liter.

In another preferred embodiment, 300 mg of a powdered mixture containing by weight 83.3% inert ingredients and 16.7% tetraglycine hydroperiodide ($C_{16}H_{48}I_7N_8O_{16}$) is impregnated on a filter paper disk 28 to form a disinfectant layer 30, assembled into a filter pack 18, used to filter a two-liter volume of water 16, and maintained in a dwelling chamber 17 for zero, five and ten minute dwelling periods after filtration is complete, as described above. Effective reduction of *K. terrigena* bacteria is summarized below in Table II.

TABLE II

| Disinfectant Amount | Dwell Time (min) | Counts cfu/g | Percent Reduction | Log Reduction |
| --- | --- | --- | --- | --- |
| 300 mg | 0 | Initial 2.10E+08 | | |
| | | Final 1.80E+00 | 99.9999991 | 8.07 |
| | 5 | Initial 2.10E+08 | | |
| | | Final 1.10E+00 | 99.9999995 | 8.28 |
| | 10 | Initial 2.10E+08 | | |
| | | Final 5.00E−01 | 99.9999998 | 8.62 |

In other preferred embodiments, 200 mg and 300 mg of powdered reagent grade chloramine-T (1-$CH_3C_6H_4$-4-$SO_2NClNa.3H_2O$) containing by weight 12% active chlorine, are pressed into individual filter paper disks 28, to form individual disinfectant layers 30 thereon. Filter packs 18 are then formed as described above in connection with the tetraglycine hydroperiodide disinfectant layer 30. The filter packs are each used to filter separate two-liter volumes of water 16, with the water maintained in a dwelling chamber 17 for zero, five and ten minute dwelling periods after filtration is complete, as described above. The effective reduction of *K. terrigena* bacteria is summarized below in Table III.

TABLE III

| Disinfectant Amount | Dwell Time (min) | Counts cfu/g | Percent Reduction | Log Reduction |
|---|---|---|---|---|
| 200 mg | 0 | Initial 2.10E+08 | | |
| | | Final 1.40E+00 | 99.9999993 | 8.18 |
| | 5 | Initial 2.10E+08 | | |
| | | Final 8.00E+00 | 99.9999962 | 7.42 |
| | 10 | Initial 2.10E+08 | | |
| | | Final 2.00E+00 | 99.9999996 | 8.02 |
| 300 mg | 0 | Initial 2.10E+08 | | |
| | | Final 5.00E−01 | 99.9999998 | 8.62 |
| | 5 | Initial 2.10E+08 | | |
| | | Final 5.00E−01 | 99.9999998 | 8.62 |
| | 10 | Initial 2.10E+08 | | |
| | | Final 5.00E−01 | 99.9999998 | 8.62 |

When disinfecting two liters of water with a filter pack 16 containing 200 mg of chloramine-T, as described above, average residual levels of total chlorine range from 20 to 25 mg chlorine per liter.

In yet another preferred embodiment, 200 mg of powdered reagent grade calcium hypochlorite $(Ca(OCl)_2$ containing by weight 30–37% available chlorine is pressed into an individual filter paper disks 28, to form individual a disinfectant layer 30 thereon. Filter packs 18 are then formed as described above in connection with the tetraglycine hydroperiodide disinfectant layer 30. The filter packs are each used to filter separate two-liter volumes of water 16, with the water maintained in a dwelling chamber 17 for zero, five and ten minute dwelling periods after filtration is complete, as described above. Effective reduction of *Klebsiella terrigena* bacteria is achieved, as is summarized below in Table IV.

TABLE IV

| Disinfectant Amount | Dwell Time (min) | Counts cfu/g | Percent Reduction | Log Reduction |
|---|---|---|---|---|
| 200 mg | 0 | Initial 2.10E+08 | | |
| | | Final 4.10E+01 | 99.9999805 | 6.71 |
| | 5 | Initial 2.10E+08 | | |
| | | Final 1.30E+01 | 99.9999938 | 7.21 |
| | 10 | Initial 2.10E+08 | | |
| | | Final 1.00E+01 | 99.9999952 | 7.32 |

When disinfecting two liters of water with a filter pack 16 containing 200 mg of powdered reagent grade calcium hypochlorite, as described above, average residual levels of free chlorine range from five to ten mg free chlorine per liter.

The predetermined amounts of tetraglycine hydroperiodide, chloramine-T, and calcium hypochlorite disinfectants, when used as described above in conjunction with the hardened ashless filter paper, provide for a disposable, one-time use filter media, which is biodegradable. Such one-time use prevents undesirable colonization of microbial organisms and grow through problems in the filter media.

To determine the efficacy and relative merits of tetraglycine hydroperiodide, chloramine-T, and calcium hypochlorite when applied to disks 28 and used as described above to treat two liters of water, tests were conducted under various combinations of the following conditions:

| CONDITION | BEST CASE PARAMETER | WORST CASE PARAMETER |
|---|---|---|
| Temperature | 20° C. | 4° C. |
| Total organic carbon (TOC) | <5 mg/l | >10 mg/l |
| Total dissolved solids (TDS) | <500 mg/l | 1500 mg/l |
| Turbidity | <5 NTU | >30 NTU |
| pH | 7 | 5 (for iodine) |
| | | 9 (for chloramine) |

The main effects of the testing, at a significance of 95%, indicated that the tetraglycine hydroperiodide was effective at all combinations of temperature, TOC, TDS, turbidity and pH tested. Tetraglycine hydroperiodide is believed unaffected by changes in the conditions identified above, within the above limits. Chloramine-T efficacy was affected by turbidity, temperature and TDS.

In an alternative embodiment, the disinfectant layer 28 is applied to a large rectangular sheet (not shown) of filter media 22, from which a plurality of the filter paper disks 28 are subsequently die cut. Although in this and other preferred embodiments the disinfectant is impregnated on a sheet of filter media by application of pressure, it should be understood that disinfectants may be otherwise applied to filter media, for example, by preforming a wafer layer of disinfectant and subsequently placing the wafer on the filter media, or by allowing a disinfection solution to saturate a filter media and evaporate, leaving dried water soluble disinfectant on the filter media.

In other preferred embodiments of the point-of-use water treatment system of the present invention, conventional water treatment disinfectants which are generally considered functional and safe for human consumption in predetermined concentrations are substituted, preferably in part for the preferred tetraglycine hydroperiodide, chloramine-T, and calcium hypochlorite disinfectants described above. Such disinfectants include, for example, calcium hypochlorite dihydrate, lithium hypochlorite, sodium hypochlorite, chlorinated trisodium phosphate, chlorine dioxide decahydrate, phenols (e.g., cresol and o-phenylphenol, anionic synthetic detergents such as sodium alkybenzene sulfonates, cationic synthetic detergents such as quaternary ammonium compounds, natural pine oil products, metal compounds such as copper sulfate, copper carbonate, zinc oxide and zinc hydroxide, and functional equivalents of the foregoing.

In yet other alternative embodiment of the point-of-use water treatment system of the present invention, an exit filter 34 is positioned in a dispensing port 36 of the container 14. The exit filter 34 is preferably constructed of approximately 5 grams of an ion exchange fiber such as that marketed under the VION® tradename by Techmashimport of Moscow, Russia. This preferred ion exchange fiber is described in a brochure entitled "New Ion Exchange Fiber—VION®", which is hereby incorporated by reference. The exit filter 34 removes residual disinfectant dissolved in the water 16. It is disposable, and may be used to process 500 liters or more of water 16 treated with a filter pack 16. More particularly, an exit filter 34 manufactured from an ion exchange fiber such as VION® has a high sorption rate (i.e., 50% saturation of fibers in 5–10 minutes), a large surface area, a linear density of 0.1–1.0 tex, elongation at rupture of 15–30%, a static exchange capacity for anion exchange of 1.8–3.0 mg eq/gm, and a capacity for cation exchange of 3.0–5.0 mg eq/gm.

In yet another alternative embodiment, the exit filter 34 comprises approximately 50 grams of granulated activated charcoal. An exit filter 34 so constructed is disposable, and may be used to process 200 liters or more of water 16 treated with a filter pack 16.

In still another alternative embodiment, the exit filter 34 comprises approximately 50 grams of carbon block. An exit filter 34 so constructed is disposable, and may be used to process approximately 100 liters of water 16 treated with a filter pack 16.

Presently preferred embodiments of the present invention and many of its improvements have been described with a degree of particularity. Further, it will be apparent to one of ordinary skill in the art that for any of the preferred embodiments described above, dwell time may be appropriately increased to compensate for harsh water treatment conditions or to target reduction of activity of specific microbial agents. It should be understood that this description has been made by way of preferred example, and that the invention is defined by the scope of the following claims.

What is claimed is:

1. A point-of-use water treatment system for treating a fixed amount of water to be dispensed from a pitcher having a fixed volume and including a water input opening formed therein, said water treatment system comprising:

means positioned adjacent said water input opening for receiving said fixed amount of water introduced into said water input opening, for filtering said received water, and for passing said filtered water into said fixed volume pitcher to dwell therein prior to dispensing therefrom;

means impregnating said filtering means for fully dissolving in said fixed amount of water, as said water is filtering through said filtering means for disinfecting said fixed amount of water, for reducing viable bacteria in said fixed amount of water by at least 99.9999% and for creating a controlled concentration of residual disinfectant in said fixed amount of water dwelling in said pitcher of at least 1 mg/liter of water;

said pitcher having a dispensing spout; and means positioned in said dispensing spout for filtering said treated water and for collecting residual disinfectant in said treated water immediately before said treated water is dispensed from said pitcher and used.

2. A water treatment system according to claim 1, wherein the disinfecting means includes tetraglycine hydroperiodide.

3. A water treatment system according to claim 1, wherein the disinfecting means includes chloramine-T.

4. A water treatment system according to claim 1, wherein the disinfecting means includes calcium hypochlorite.

5. A water treatment system according to claim 1, wherein the disinfecting means is a disinfectant selected from the group consisting of tetraglycine hydroperiodide, chloramine-T, and calcium hypochlorite.

6. A water treatment system according to claim 5 wherein said disinfecting means includes at least 100 mg of said disinfectant impregnated on or in said filtering means for each 1 liter of the fixed amount of water.

7. A water treatment system according to claim 1 wherein said disinfecting means is selected from the group consisting of chloramine-T and calcium hypochlorite, and tetraglycine hydroperiodide, and wherein the water treatment system further includes:

means for pretreating said water before it is filtered by said receiving, filtering and passing means.

8. A water treatment system according to claim 7 wherein said pretreating means includes means for trapping sediment in said water.

* * * * *